United States Patent [19]

Blount et al.

[11] Patent Number: 5,549,090
[45] Date of Patent: Aug. 27, 1996

[54] ELECTRONIC IGNITION SYSTEM FOR COMBUSTION ENGINES

[76] Inventors: David H. Blount, 6728 Del Cerro Blvd., San Diego, Calif. 92120; James O. Blount, 5012 Lawson Ave., Gulfport, Miss. 39501

[21] Appl. No.: 348,320

[22] Filed: Dec. 2, 1994

Related U.S. Application Data

[60] Continuation-in-part of Ser. No. 091,258, Jul. 15, 1993, Pat. No. 5,433,176, which is a division of Ser. No. 956,269, Oct. 5, 1992, Pat. No. 5,301,637, which is a division of Ser. No. 560,868, Jul. 31, 1990, Pat. No. 5,152,257.

[51] Int. Cl.⁶ ..................................................... F22D 1/00
[52] U.S. Cl. ............................................................. 123/414
[58] Field of Search ................................... 123/414, 415, 123/427, 617

[56] References Cited

U.S. PATENT DOCUMENTS

3,937,193  2/1976  Kim ........................................ 123/427
4,760,827  8/1988  Schreiber et al. ...................... 123/414
5,046,468  9/1991  Erhard ................................... 123/414
5,239,962  8/1993  Fukui et al. ............................ 123/414
5,325,710  7/1994  Morikawa ............................... 123/414

Primary Examiner—Noah P. Kamen

[57] ABSTRACT

An electronic ignition system for a spark-ignition internal combustion engines which has a timing disk attached to the engine's shaft. The timing disk has peripherally located permanent magnets at desired locations which generates an output timing signal for each cylinder group. These output signal are picked up by sensor pickups which are connected to circuits for amplifying and shaping the timing signals. The coil driver switch charges the ignition coil and the spark plug is then fired. This ignition system is an improvement and a simpler ignition system then that which is usually utilized in reciprocal and rotary engines because it does not require the use of a computer or distributor and is particularly useful in the novel rotary-reciprocal engines.

1 Claim, 6 Drawing Sheets

FIG. 13

ELECTRONIC IGNITION SYSTEM FOR COMBUSTION ENGINES

This electronic engine ignition system application is a continuation in part of U.S. patent application Ser. No. 08/091,258 filed Jul. 15, 1993, now U.S. Pat. No. 5,433,176, which is a divisional application of Ser. No. 07/956,269 filed Oct. 5, 1992, now U.S. Pat. No. 5,301,537, which is a division of U.S patent application Ser. No. 07/560,868, filed Jul. 31, 1990, now U.S. Pat. No. 5,152,257.

This invention is a novel electronic ignition system for rotary-reciprocal engines which are produced by the methods of U.S. patent application Ser. No. 08/091,258, filed Jul. 15, 1993, and U.S. Pat. Nos. 5,156,115 and 5,152,257 which are incorporated into this application. The invention relates to the ignition system for rotary-reciprocal combustion engines, rotary combustion engines, reciprocal combustion engines and the method to produce this ignition system. This ignition system is an improvement and a simpler ignition system than that which is usually utilized in reciprocal and rotary combustion engines because it does not require a distributor or computer.

There is a basic need for the ignition system on rotary-reciprocal combustion engines to be different from the known ignitions systems because the rotary-reciprocal engines fire two or more times per revolution, and may require two or more spark plug to be fired at the same time. The rotary-reciprocal combustion engines also may be designed as single, double or multiple engines on the same shaft which require completely different and novel ignition systems from the rotary or reciprocal engines. This ignition system is designed to be utilized on the various types of rotary-reciprocal engines such as the single two cycle, the single four cycle, double two cycle, double four cycle and multiple engines. Two or more of the cylinders of these engines may be fired at the same time. The object of this invention is to provide novel ignition systems for rotary-reciprocal,rotary and reciprocal combustion engines.

In order to accommodate the various number of cylinder to be fired at the same time, and the number of firings per revolution this ignition system utilized a non-conductive material such as aluminum in the form of a disk. This disk is attached to the shaft and contains multiple magnets at the necessary points or degrees to activate a sensor pickup. More than one of these disk may be utilized on the shaft when needed. Sensor pickups may be placed at the necessary points or degrees to activate the ignition system.

The single and double two cycle rotary-reciprocal combustion engines has two or more spark plugs which fire at the same time, and fire two or more times per revolution depending on the number of cylinders in the engine. The single four cycle engines fires one or more times per revolution depending on the number of cylinders in the engine. The double two cycle engine fires at least two times in each engine per revolution and may fire two or more spark plugs at the same time.

This ignition system for rotary-reciprocal, rotary and reciprocal combustion engines consist of a non-magnetic disk which is attached to the shaft and rotates with the shaft. This disk contains magnets on the peripheral area which are located at the right degree to activate a sensor pickup. The sensor pickup is attached to mounting ring which is attached to the engine. The sensor pickups remain stationary until a change in timing is required, and is activated when a magnet is rotated to a position opposite to the sensor pickup. The pickup coil mounting ring is designed so that the timing can be adjusted by rotating coil's mounting ring to retard or advance timing The sensory pickups are stationary but their holder is designed so that it can be adjusted as to how close it is to the magnet, and it can be adjusted in its location as related to the degrees. The sensor pickups are connected to an electronic ignition system.

The timing mechanism consist of a dust cover, a guide plate which rotates with the shaft, a stabilizing spring which is attached to the guide plate and magnet holding ring, a non-magnet disk which is made up of a magnet holding ring and an inner base for the magnet holding ring. The magnets induce approximately 0.5 volt pulse into sensor pickups. The sensors pickups are mounted on a mounting ring and attached to the engine.

ELECTRONIC COMPONENTS

The electronic components of this ignition system consist of permanent magnets which are arranged on a magnet holding ring at specific degree positions to provide proper timing for each type of rotary-reciprocal, rotary or reciprocal combustion engine. Magnetic fields produce properly timed electrical pulses by inducing voltage into the sensory pickup coils. This voltage pulse is transferred to the shaping and amplifying component by wire. A near by transistor pre-amplifier increases the voltage amplitude to assure sufficient power to trigger the pulse shaping multivibrator. The shaping multivibrator produces a rectangular coil driving pulse. The pulse duration is adjusted by a 10 K $\Omega$ vailable resistor. This pulse is amplified by a Darlington configured amplifier. The Darlington configured amplifier develops sufficient power to activate coil charging current driver (NTE 163 A or equivalent Component). This driver acts like a switch which allows current (approximately 10 amps.) to flow through the coil's primary windings. The electronic circuit uses a coil with two or more spark plug wires. The secondary windings produce a very high voltage with ample power to fire several spark plugs. The power source consist of 12 volt DC battery or any other direct current source which produces the correct voltage and power.

DESCRIPTION OF THE DRAWINGS

Other objects of the invention will become apparent upon reading the annexed detail description in connection with the drawing in which.

DESCRIPTION OF PREFERRED EMBODIMENT

Figure 1:
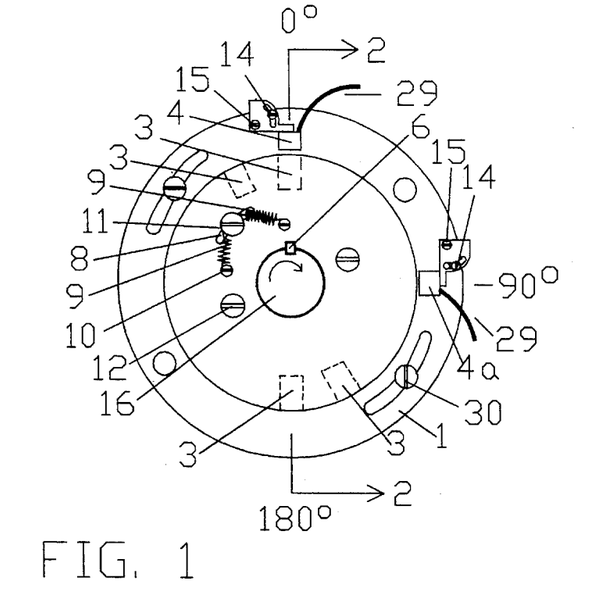
FIG. 1 is a frontal view of the rotary-reciprocal, rotary or reciprocal combustion engine's timing mechanism.
Figure 2:
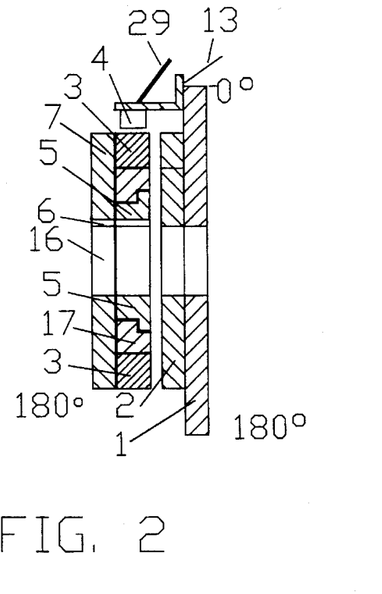
FIG. 2 is a cross-section of FIG. 1, the timing mechanism.

Referring to the drawings and in particular to FIG. 1 and FIG. 2 the timing mechanism for rotary-reciprocal combustion engines with its dust cover removed which consist of a mounting ring 1 which is bolted within adjustment slots 30 to the engine and is stationary. The sensory pickup 4 is bolted to the mounting plate 1 by means of a bolt or fastener 15 and has slot 14 for adjusting the sensor pickup's position. The sensory pickup 4 is connected by a wire 29 to the electronic system. There is a engine bearing hub 2 which supports the mounting ring 1 and to the left of it is a non-magnetic disk which consist of an inner base 5 which has a hole to fit over the shaft 16 and is held in position by a Key 6. It rotates with the shaft, and is bolted to the guide plate by bolts 12 which also rotates with the shaft. The disk also contains an outer magnet holding ring 17 which hold the magnet 3 in place. There are two springs 9 in front of the guide plate 7 which are attached to the guide plate 7 by bolt 10 and in the center by bolt 11. Bolt 11 fits into a slot 8 in the guide plate and bolts into the magnet holding ring 17 and allows the timing to be centrifugally advanced or retarded.

Figure 3:
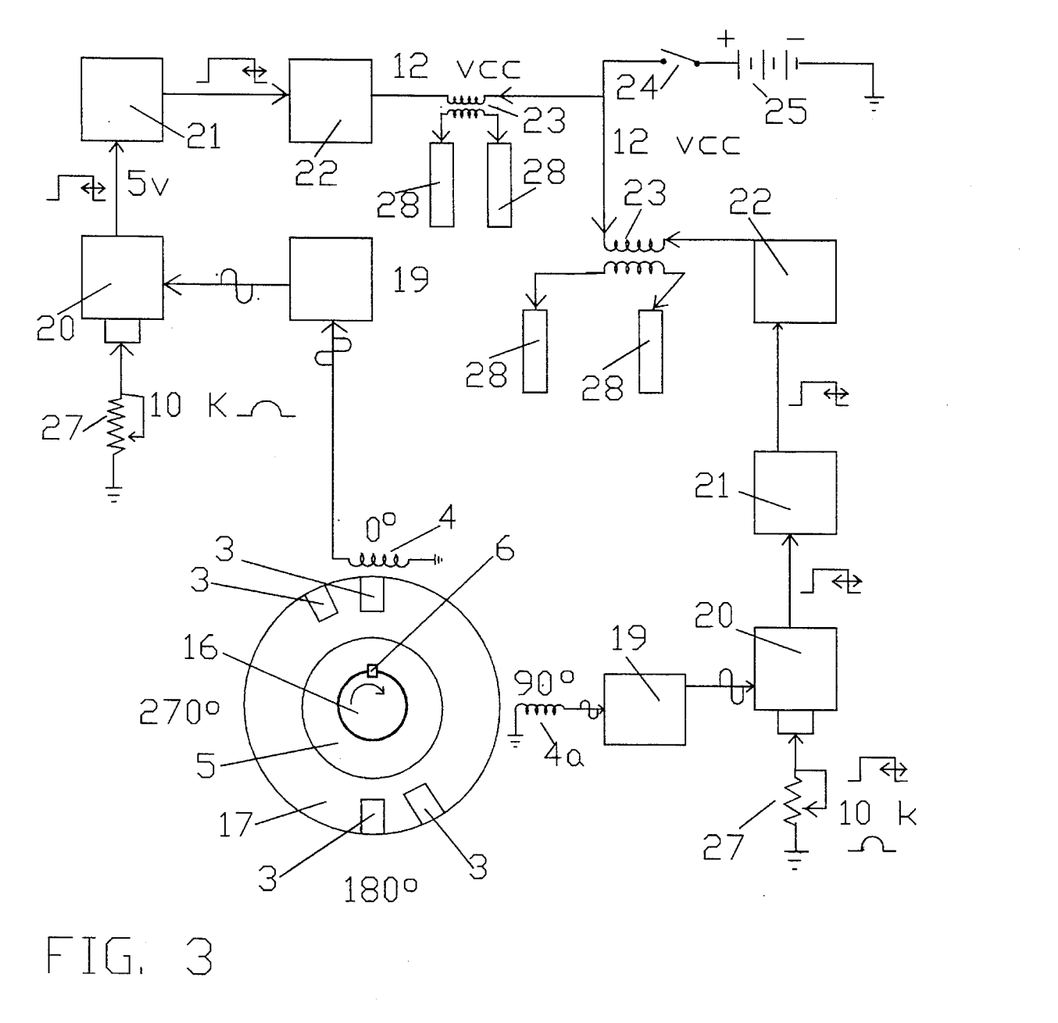
FIG. 3 is an electronic functional diagram of the ignition system for a double rotary-reciprocal, rotary or reciprocal combustion engine.
Figure 13:
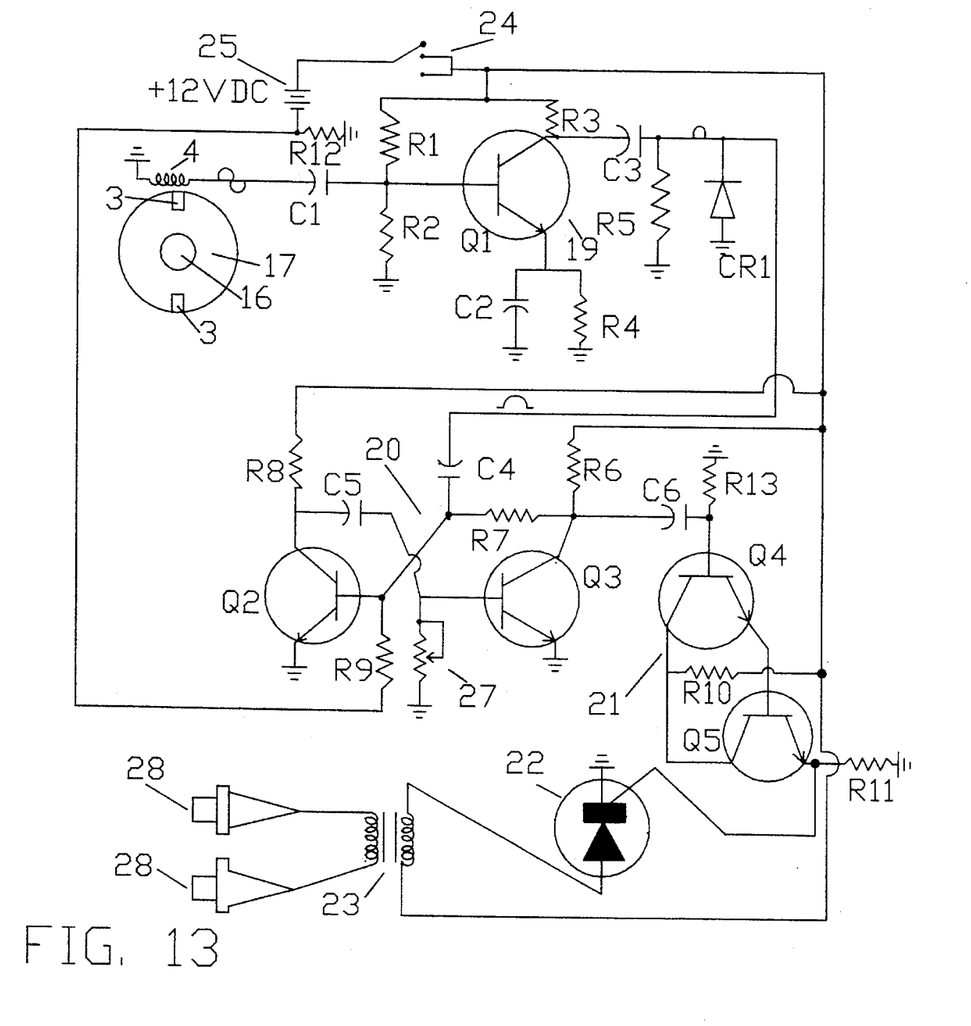
FIG. 13 is an electronic functional diagram of the electronic ignition system for combustion engines.

Referring to FIG. 3, a frontal view of the timing mechanism's non-magnet metal or plastics disk with 2 sets of double magnets 3 and two sensor pickups 4, one for each engine of the double engine which may be a two or four cycle, two cylinder, double rotary-reciprocal combustion engine. This disk rotates with the shaft 16 and is held in position on the shaft with a key 6. Referring to FIG. 13, the magnetic fields from permanent magnets 3 induce approximately 0.5 volts properly timed pulse into sensor pickup coils 4. This 0.5 volts timing pulse is transferred by wire 29 to the transistor pre-amplifier 19 to assure sufficient voltage to trigger pulse shaping single shot multivibrator 20. This multivibrator forms a rectangular coil charging pulse each time magnets 3 induce voltages into sensor pickups 4. Coil's 23 charging time is adjusted by 10 K Ω variable resistor 27. Registor 27 change the charging duration C5 which adjusts coil's 23 charging dwell time. The multivibrator's 20 variable output is amplified with a Darlington pair configured gate amplifier 21. Current driver switch 22 produces approximately 10 Amps. of current through the primary winding of coil 23. This is sufficient charging current to develop high voltage required to simultaneously fire the two spark plugs 28. Start-run-stop switch 24 connects direct current voltage source 25 to electronic circuit. Additional above described coil 23 charging circuits are applied when more than one engine is utilized or when several plugs and lagging magnets 3 are used when cylinder are fired twice to assure maximum fuel bum and to reduce pollutants. The lagging magnet 3 develops a second coil 23 charging pulse approximately 20 degrees after the primary magnets 3 has produced its coil charging pulse. The second electronic circuit in made up of the same type of electronic components and fire the second engines set of spark plugs.

Referring to FIG. 4–11 which are frontal views of timing disks which shows the location and number of magnets on each disk and the location of the sensor pickups for the various types of single and double rotary-reciprocal combustion engines. The single engines have one or more sensory pickups 4 and the double engines have two or more sensory pickups 4a.

Figure 12:
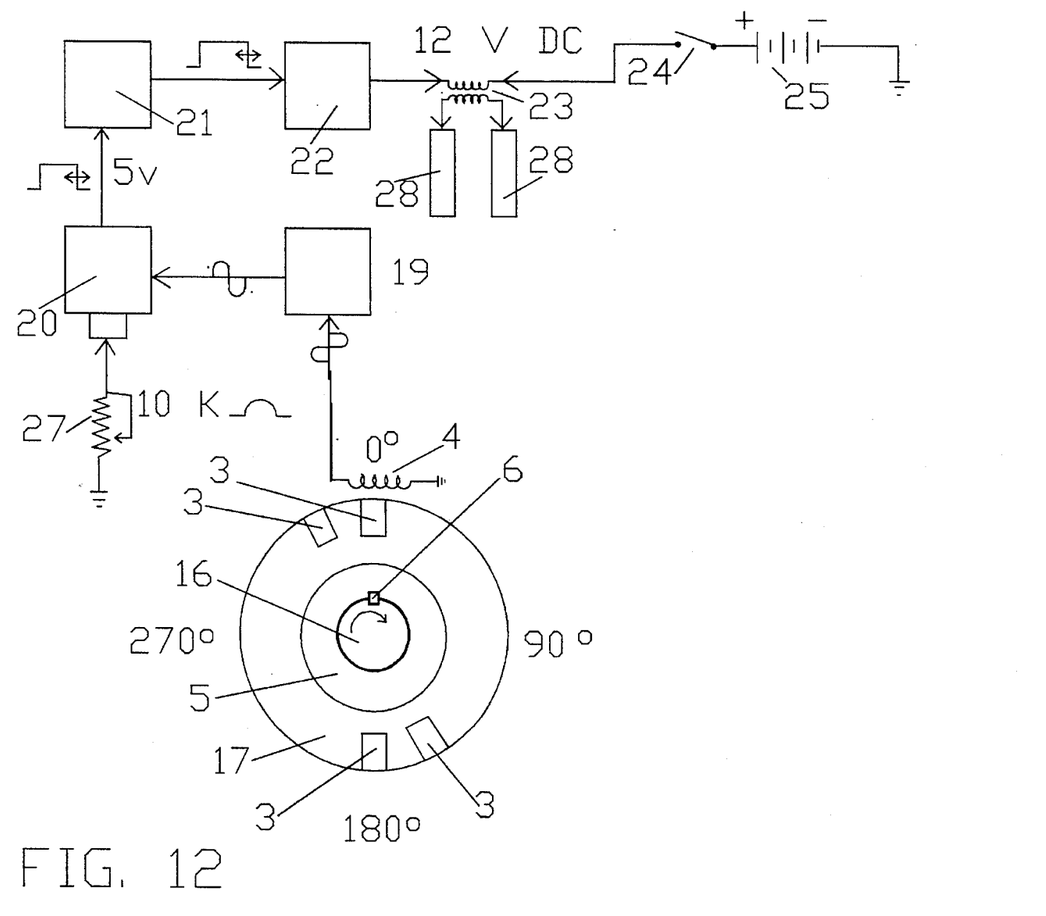
FIG. 12 is an electronic diagram of the ignition system for a rotary-reciprocal, rotary or reciprocal single engine with a frontal view of a disk of non-magnetic metal or plastics with magnets and sensory pickup, there are two magnets per cylinder and two spark plugs per cylinder, for a two or four cycle, two cylinder single rotary-reciprocal engine.

Referring to FIG. 12 which is the electronic circuit of a single rotary-reciprocal, rotary or reciprocal combustion engine and a non-magnetic metal or plastic timing disk for a two or four cycle, two cylinder single engine which has double spark plugs 28 in each cylinder and there are two firing, one right after the other in each cylinder. The disk contains two double sets of magnets 3 primary or leading magnets are located 180 degrees apart with additional lagging magnets to assure that each cylinder is fired twice for pollution control and maximum power bum, and there is a sensor pickup 4 at 0 degrees which transfers the magnet flux of the magnets 3 into voltage pulse for the electronic circuit. The electronic circuit is the same as one of the electronic circuits in FIG. 3.

OPERATION

The basic operation of the electronic ignition system of this invention consist of the magnets 3 producing a magnetic field from the permanent magnets 3 which induce approximately 0.5 volt properly timed pulse into sensor pickup coils 4. This 0.5 volt pulse is transferred by wire 29 to the associated electronic shaping and amplifying circuits. The electronic shaping, amplifying and coil charging circuit consist of a transistor pre-amplifier 19 to assure sufficient voltage to trigger pulse shaping multivibrator 20. S 3180/263 or similar quality component is used to form a timing pulse which provides a sharp coil 23 turn-on and off driving pulse which can be adjusted in coil 23 charging duration by 10 K Ω variable resistor 27. The S 74121 multivibrator shapes the coil 23 driving signal. The multivibrator's 20 out put is amplified with a transistor amplifier 21 formed by a Darlington pair configuration. This configuration assures sufficient power to turn on coil's 23 current driver switch 22. The NTE 163 or equivalent current driver switch 22 produces approximately 10 Amps. of current through the primary winding of coil 23. This sufficient charging current to develop high voltage required to simultaneously fire the two spark plugs 28. Start-run-stop switch 24 connects direct current voltage source 25 to electronic circuit. Additional above described coil 23 charging circuits are applied when more than one engine is utilized or when several plugs must be fired simultaneously. Primary and lagging magnets 3 are used when cylinder are fired twice to assure maximum fuel burn and to reduce pollutants. The lagging magnet 3 develops a second coil 23 charge pulse approximately 20 degrees after the primary magnet 3 has produced its coil charging pulse. The second circuit is made up of the same type of electronic components and fire the second set of spark plugs.

The electronic ignition system for a two cycle, two cylinder rotary-reciprocal single engine as illustrated in FIG. 1, 2, 5 and 12, the timing mechanism consisting of guide plate in front and behind it is a timing disk of non-magnetic metal or plastics divided into an inner holding ring 5 and a magnet support ring 17 for magnets 3. The guide plate 7 and the timing disk 5, 17 are fixed to the shaft 16 by means of a key 6 and both rotates with the shaft. Behind the timing disk is the engine's beating hub 2 and a sensor pickup mounting ring 1 which are attached to the engine through a slotted adjustment groove. The sensory pickups are attached to the mounting ring 1 and remain stationary unless timing is mechanically advanced or retarded. The sensor pickups may be moved by the manual lever 13 to advance or retard the timing. The sensory pickup 4 is located at 0 degrees and is attached by wire to the electronic circuit. The sensor pickup 4 holder has a slot 14 so that the position of the sensor pickup can be adjusted as needed. There are two springs 9 with one end attached to the guide plate 7 and the other ends attached to a bolt 11 which passes through a slot and attached to the magnet holding ring 17 allowing an advancement or retardation of the timing during sudden slow down or acceleration and stabilizes the magnet holding ring.

The timing mechanism of FIG. 12 has a disk which contains two sets of double magnets 3, one at approximately 340 degrees and one at 0 degrees, then another set with one magnet approximately at 160 degrees and one at 180 degree. When this disk is used for a two cycle, two cylinder rotary-reciprocal combustion the magnetic wave from the magnet 3 at 0 degree is picked up by the sensor pickup at 0 degree and an electrical pulse is passed through the electronic components of the circuit to the park plugs 28 in each cylinder and they fire, then the shaft and timing disk rotates clockwise approximately 20 degrees and the second magnet's 3 magnetic field induces another voltage pulse into the sensor pickup at 0 degrees. This electrical pulse is sent through the electronic components of the circuit to the spark plugs 28 and they fire again. The shaft 16 and timing disk is rotated 180 degrees, and the magnetic field from 180 degree magnet 3 induces a voltage pulse into sensor pickup 4 at 0 degree. The electrical pulse is sent through the electronic components and it is shaped and amplified to charge coil 23 and then to the spark plugs 28 and they fire again. When the timing disk turns approximately 20 degrees the second magnet 3 induces a voltage pulse into the sensor pickup 4 which sends an electrical pulse through the electronic components of the circuit to the spark plugs 28 which fire again. The shaft and timing disk rotates 180 degrees, and the spark plugs firing start over. When this timing disk is used in a four cycle, two cylinder rotary-reciprocal combustion engine there are two spark plugs 28 in one of the cylinder and only one cylinder is fired at a time. The magnetic field magnet 3 at 0 degree point is picked up by the sensor pickup 4 at 0 degree and send an electrical impulse through the electronic components circuit, and the spark plugs 28 are fired thereby rotating the shaft 16 and timing disk approximately 20 degrees clockwise thereby moving the second magnet 3 to 0 degree under the sensory pickup 4, and the magnetic field induces electrical pulse is sent through the electronic components of the circuit to the spark plugs 28 thereby firing them again. The shaft 16 and timing disk are rotated 180 degrees to forms a magnetic field which induces a voltage pulse into the sensory pickup 4, then sends and electrical pulse through the electronic components of the circuit to the spark plugs 28 and they fire again. Shaft 16 rotates timing disk approximately 20 degrees clockwise therefore the second magnets 3 rotates to the 0 degree and induces a voltage pulse into sensor pickup at 0 degree, then an electrical pulse is sent through the electronic components of the circuit and the sparks plugs 28 fire again. The shaft 16 and timing disk is rotated 180 degree back to it original position and the firing sequences starts over again.

Figure 4:
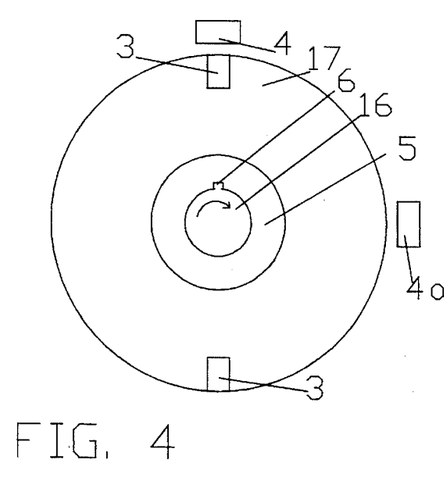
FIG. 4 is a disk of non-magnetic metal or plastics with magnets and sensor pickups for a double two cycle engine with two cylinders.
Figure 5:
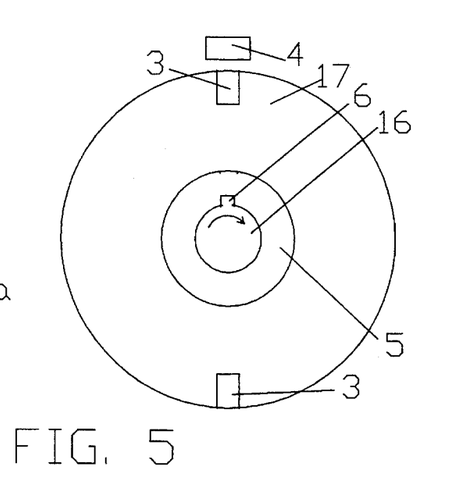
FIG. 5 is a frontal view of a disk of non-magnetic metal or plastics with magnets and a sensor pickup for a two cycle, two cylinder single engine or a 4 cycle, two cylinder single engine.

The timing mechanism of FIG. 3 and 4 has a timing disk for a two or four cycle, two cylinder double rotary-reciprocal combustion engine. FIG. 3 has two sets of double magnets 3 approximately 20 degrees apart whereas FIG. 4 has two sets of single magnets. There are two sensor pickups 4, one at 0 degree for one engine and another sensor pickup 4a at 90 degrees for the other engine so that the engines will be fired one after the other. When this timing disk of FIG. 3 is used for a two cycle, two cylinder, double engine which has a spark plug 28 in each cylinder of each engine the magnetic field of the magnet 3 at 0 degree induces a voltage pulse into sensor pickup 4 at 0 degree, and an electrical pulse is sent through the electronic components of the circuit and the spark plugs 28 in the two cylinders of one of the engines are fired at the same time. Shaft 16 rotates timing disk approximately 20 degrees clockwise therefore the second (lagging) magnet 3 rotates to the 0 degree position, and induces a voltage pulse into sensor pickup 4 at 0 degree position. An electrical pulse is sent from the sensor pickup 4 through the electronic components of the circuit thereby firing the two spark plugs again. These firings rotate the shaft 16 and timing disk clockwise to 90 degrees and the magnet at 0 degree then induces a voltage pulse into the sensory pickup 4a which sends an electrical coil firing pulse through the electronic components of the circuit thereby firing the two spark plugs 28 in the other engine. Shaft 16 rotates the timing disk approximately 20 degrees and the second (lagging) magnet 3 induces another voltage pulse into the 90 degree sensory pickup 4a which then send the coil firing pulse to the electronic components of the circuit and fires the spark plugs 28 of the second engine, both cylinders are fired at the same time which rotates the shaft 16 and timing disk approximately 20 degrees. The second (lagging) magnet 3 rotates to the sensor pickup 4a position. The magnetic field induces a voltage pulse into the sensory pickup 4a, this electrical pulse is shaped and amplified within the electronic components to charge the coil 23 thereby fires the spark plugs 28 again in the second engine. Shaft 16 rotates timing disk another 90 degree to 180 degrees and the primary magnet 3 rotate to 0 degree. This causes the 180 degree magnet 3 to induce a timing pulse into sensor pickup 4 at 0 degree position. Sensor pickup coil 4 is activated by the magnetic field from this magnet 3 and the sensor pickup sends an electrical pulse through the electronic components of the circuit to shape and amplify the pulse to fire coil 23 thereby firing the spark plugs 28 of the first engine. Shaft 16 rotates timing disk approximately 20 degrees and the second (lagging) magnet's 3 field induces a voltage pulse into sensor pickup 4 at 0 degree position. Sensor pickup 4 transfers this timing pulse to the electronic circuit where it is shaped and amplified to fire coil 23 thereby firing the spark plug 28 again. Shaft 16 rotates timing disk approximately 90 degrees where the 180 degree magnet 3 is at the sensor pickup 4a at 90 degrees, it induces a timing pulse into sensor pickup 4a then sends an electrical pulse through the shaping and amplifying electronic components to charge coil 23 thereby firings the spark plugs 28 of the other engine. Shaft 16 rotates timing disk approximately 20 degrees and the second (lagging) magnet's 3 field induces a voltage pulse into the 90 degree sensor pickup 4a which in conjunction with shaping and amplifying electronic components charge coil 23 and fires the spark plugs 28 again. Shaft 16 rotates timing disk back to its original position and the firing start over.

When the timing disk of FIG. 4 is used on a two cycle, two cylinder rotary-reciprocal combustion engine as in FIG. 3 the firing sequence is the same except that it has only single magnets at 0 degree and at 180 degrees and there is no second firing in each cylinder chamber. Each engines chambers are fired twice per revolution.

When the timing disk of FIG. 3 is used for a four cycle, two cylinder rotary-reciprocal combustion engine only one cylinder with double spark plugs 28 is fired at one time. Referring to FIG. 3, the following operational analysis relates to a two cycle, 2 cylinder, double engine. The primary magnet at 0 degree position induces a voltage timing pulse into the 0 degree sensor pickup 4. Sensor pickup's voltage pulse is shaped and amplified within the electronic components, the spark plugs of the first engine fires thereby rotating the shaft 16 and timing disk approximately 20 degrees until the second (lagging) magnet 3, induces a timing pulse into sensor pickup 4. Sensor pickup's 4 voltage pulse is shaped and amplified within the electronic components of the circuit to charge coil 23 then fires spark plug 28 again. Shaft 16 rotates timing disk 90 degrees placing the primary 0 degree magnet 3 opposite the sensor pickup 4a at 90 degrees position. Primary magnet's 3 field induces a voltage timing pulse into the 90 degree pickup sensor 4a. The magnet waves then sends electrical pulses through the electronic components of the circuit. This timing pulse is shaped and amplified within the electronic components. The amplified pulse charges coil 23 and it high voltage output fires the spark plugs 28 of the second engine. Shaft 16 rotates timing disk approximately 20 degrees then the second (lagging) magnet 3 induces a voltage pulse into the sensor pickup 4a. This electrical pulse travels through the electronic components of the circuit which fires the spark plugs 28 again in the second engine. Shaft 16 rotates timing disk 90 degrees placing the primary 180 degree magnet at the 0 degrees position. At this point magnet 3 induces a voltage into the sensor pickup 4 at 0 degree. The field induces a timing voltage pulse into sensor pickup 4. The voltage pulse developed by magnetic field is shaped and amplified by the electronic components to charge coil 23 thereby fires spark plugs 28 in the second cylinder chamber of the first engine. Shaft 16 rotates timing disk approximately 20 degrees. The lagging magnet 3 now induces a voltage pulse into sensory pickup 4. This timing pulse is shaped and amplified within the electronic components of the circuit and again fires the spark plugs 28. Shaft 16 rotates timing disk 90 degrees. The 180 degree magnet 3 now induces a voltage pulse into sensor pickup 4a at 90 degrees. This voltage pulse is shaped and amplified in the electronic components of the circuit thereby fires the spark plugs 28 of the second engine. Shaft 16 rotates timing disk approximately 20 degrees then the second magnet or lagging 3 induces a voltage into sensor pickup 4a. Sensor pickup's 4a pulse is shaped and amplified in the electronic components of the circuit thereby charging coil 23 to fire the spark plugs 28 again in the second engine. When shaft 16 rotates timing disk 90 degrees it is back to it original position and a new rotation is started.

Figure 6:
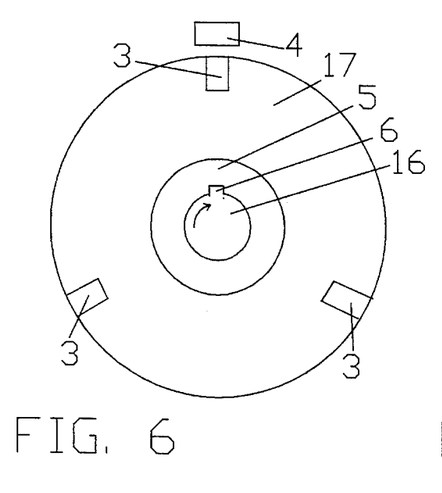
FIG. 6 is a frontal view of a disk of non-magnetic metal or plastics with magnets and a sensor pickup for a two or four cycle, three cylinder single engine.

When the timing disk of FIG. 6 is used on a two cycle, three cylinder single rotary-reciprocal combustion engine the spark plugs fire three time per revolution and each cylinder chamber has one or two spark plugs 28. All of the spark plugs fire at the same time. It operates basically the same way that FIG. 5 does except that it has three magnets instead of two with one sensory pickup at 0 degree and fires three times per revolution. When the timing disk of FIG. 6 is used on a four cycle, 3 cylinder single rotary-reciprocal engine only one cylinder chamber is fired at one time, and only one cylinder chamber has one or two spark plugs 28. It operates likes the disk of FIG. 5 when it is used for a four cycle, single engine except that there are three magnets 3 instead of two magnets and there are three firings in a single cylinder chamber per revolution.

Figure 7:
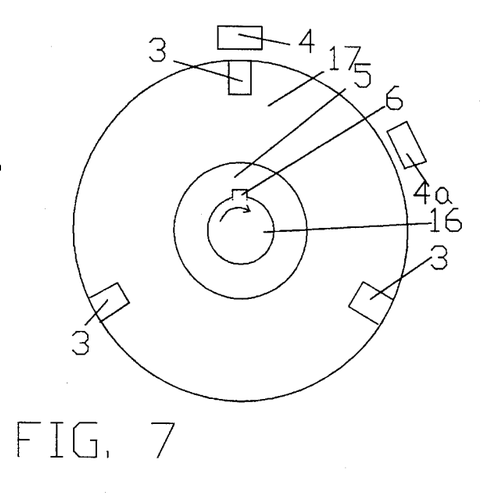
FIG. 7 is a frontal view of a disk of non-magnetic metal or plastics with magnets and two sensor pickups for a two or four cycle, three cylinder double engine.

When the timing disk of FIG. 7 is used on a two cycle, three cylinder double rotary-reciprocal engine the spark plugs fire simultaneously in all three cylinder chambers and all are fired three time per revolution. It operates basically like the disk of FIG.4 when used on a two cycle engine except that there are three cylinder chambers and three magnets 3 instead of two and each of the three chambers has one or two spark plugs 28 which are fired three times per revolution and there is a 120 degree rotation of the shaft 16 on each firing. When the disk of FIG. 7 is used on a four cycle, three cylinder double engine the spark plugs are fired three times per revolution but only in one cylinder chamber at a time. It operates basically like the disk of FIG. 4 when used on a four cycle engine except that there are three cylinder chambers per engine and each cylinder chamber is fired once per revolution. There are one or two spark plugs 28 per engine and found in one cylinder of each engine. The shaft 16 rotates 120 degrees per firing.

Figure 8:
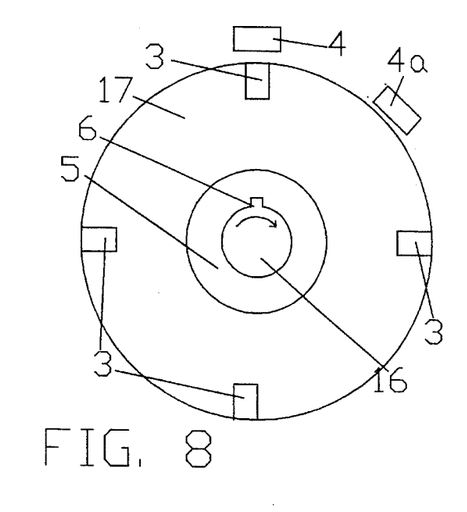
FIG. 8 is a frontal view of a disk of non-magnetic metal or plastics with magnets and sensor pickups for a two or four cycle, four cylinder double engine.

When the timing disk of FIG. 8 is used on a two cycle, four cylinder, double rotary-reciprocal combustion engine there is a firing of one or two spark plugs in each cylinder chamber of each engine four times, a total of eight firings per revolution, and the shaft 16 rotates 90 degrees per firing in each engine. After the first engine fires the second engine fires after a 45 degree shaft rotation clockwise. It operates basically like the timing disk of FIG. 4 when used on a two cycle, double engine except there are four cylinder chambers, four magnets on the disk and the same amount of sensor pickups 4. The magnets are rotated opposite the sensor pickup and the magnets waves are picked up by the sensor pickup then it sends and electrical impulse through the electronic components of the circuit thereby firing the spark plugs 28. When the timing disk of FIG. 8 is used on a four cycle, four cylinder, double rotary-reciprocal engine there are one or two spark plugs in two cylinder chamber of each engine and only two cylinders are fired at the same time. It operates basically like the timing dick of FIG. 4 when used on a four cycle, double engine except there are four cylinder chambers, four magnet 3 and a sensor pickup 4 and 4a for each engine. The magnets 3 are rotated to induce a voltage pulse into the sensor pickup 4 which converts the magnetic fields to a timing voltage pulse then sends this pulse through the electronic components for shaping and amplification to charge coil 23 to fire the spark plugs 28 in two of the cylinder chambers. Shaft 16 rotates an additional 45 degrees, magnet 3 induces a voltage pulse into sensor pickup 4a. This circuit fires the spark plugs in two of the cylinder chambers in the second engine.

Figure 9:
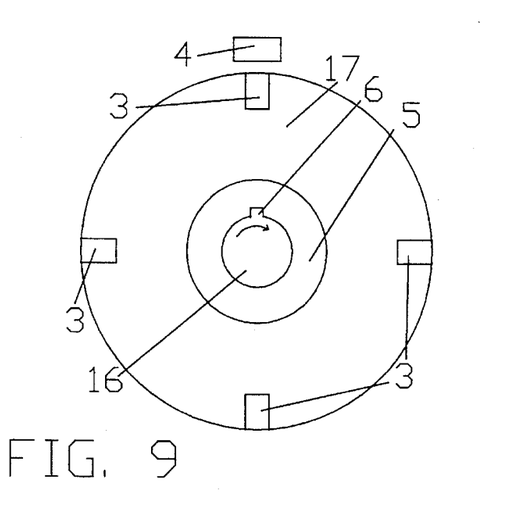
FIG. 9 is a frontal view of a disk of non-magnetic metal or plastics with magnets and sensor pickups for a two or four cycle, four cylinder single rotary-reciprocal engine.

When the timing disk of FIG. 9 is used on a two cycle, four cylinder rotary-reciprocal combustion single engine there are one or two spark plugs in each cylinder chamber and the are fired at the same time. The method of operation is basically the same as the timing disk of FIG. 5 except there are four magnets 3 instead of two. The magnets are rotated clockwise and induces a voltage pulse into the one sensor 4. This voltage pulse is shaped and amplified the sent to charge coil 23 thereby firing the spark plugs 28 in all of the cylinders. Ninety degrees later the next magnet 3 induces a voltage into the sensor pickup 4 and the firing starts again. When the timing disk of FIG. 9 is used on a four cycle, four cylinder rotary-reciprocal combustion engine there are one or two spark plugs 28 in every other cylinder chamber. There are four magnets 3 and one sensor pickup 4 on the timing disk. Its method of operation is basically the same as the timing disk of FIG. 5 except that there are four magnets 3 instead of two. Each magnet induces a voltage pulse into the sensor pickup 4. This pulse is shaped and amplified within the electronic components to charge coil 23 of the circuit thereby firing the spark plugs in two of the cylinder chambers which produces a 90 degree rotation to place the next magnet in a position to induce a voltage pulse into sensor pickup 4 and the firing starts again. Two of the timing disks of FIG. 5 or 9 may be used as the ignition system on a two or four cycle double engine by placing the sensor pickup 4 over the first disk at 0 degrees on one engine and at 45 degrees on the second engine.

Figure 10:
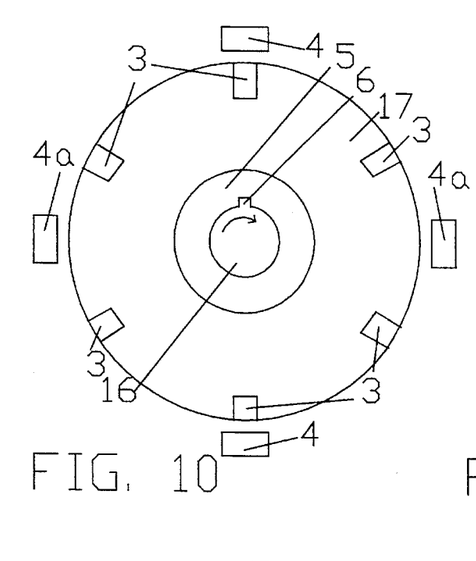
FIG. 10 is a frontal view of a disk of non-magnetic metal or plastics with magnets and sensor pickups for a two or four cycle, six cylinder double rotary-reciprocal engine.
Figure 11:
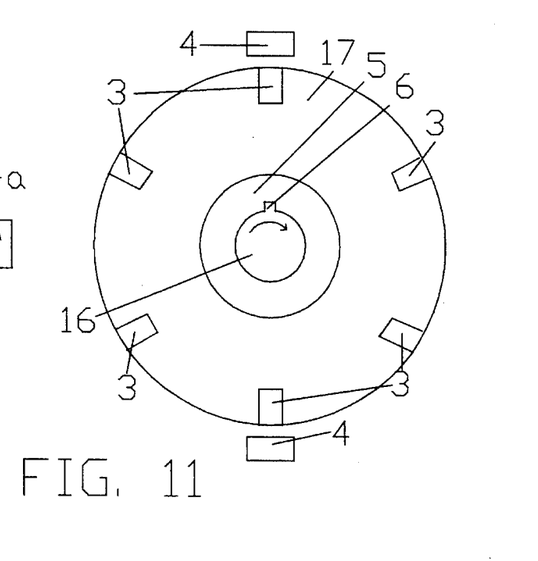
FIG. 11 is a frontal view of a disk of non-magnetic or plastics with magnets and sensor pickups for a two or four cycle, six cylinder, single rotary-reciprocal engine.

The timing disk of FIG. 10 utilizes a double sensor pickup system one, at 0 degree and one at 180 degree for the first engine and for the second engine there is a sensor pickup 4a at 90 degree and 270 degree and there are six magnets 3. When this timing disk is used on a six cylinder, two cycle rotary-reciprocal combustion engine all six chambers are fired at the same time. The method of operation is basically the same as the timing disk of FIG. 7 except there are twice as many magnets 3 and twice as many sensor pickups. The timing disk is rotated until one magnet 3 is at 0 degree and another magnet is at 180 degree which simultaneously induces a voltage pulse into sensory 4. The electronic circuits shape and amplify pulse to charge coil 23 to fire the spark plugs 28 in the first engine. Shaft rotates 45 degrees until magnet 3 induces a voltage pulse into sensor pickup 4a for the second engine. Sensor pickup 4a develop voltage pulses which are shaped and amplified to drive coil 23 thereby firing the spark plugs 28 of the second engine and as the rotation continues the firing continues. The cylinder chamber are fired 6 time per revolution for each engine giving twelve firing per revolution. The timing disk of FIG. 10 when used with a four cycle, six cylinder engine operates the same as the timing disk of FIG. 7 when used for a four cycle engine except that there are twice as many magnets 3 and sensory pickups 4. In the six cylinder rotary-reciprocal engine there are one or two spark plugs in each of the two opposite cylinder chambers which are fired at the same time and there is a sensor pickup 4 for each set of spark plugs. The timing disk is rotated until a magnet 3 induces a voltage into the sensory pickup 4 at 0 degree and 180 degree. These voltage pulses are shaped and amplified in their respective electronic circuit to drive charging current through coil 23 thereby firing the spark plugs in opposite cylinder chambers. The timing disk 17 is rotated 45 degrees until the next magnet induces voltage pulses into sensor pickup 4a for the second engine. Sensor pickup 4a develops a voltage pulse which is shaped and amplified in the electronic components of the circuit thereby firing the spark plugs 28 in the second engine thereby rotating the shaft and timing disk and continuing the spark plug firing. The timing disk of FIG. 11 operates basically like the disk of FIG. 10 except that it is only for single six cylinder rotary-reciprocal combustion engines.

The timing disk of FIG. 6 when used on a rotary combustion engine with three cylinder chambers which has one or two spark plugs 28 in one cylinder chamber will fire three times per revolution. The timing disk is attached to the engines shaft and rotates with the shaft. The magnets 3 on the timing disk are rotated by the stationary 0 degree sensor pickup 4. The magnetic fields induce a voltage into sensor pickup 4. These pulses are shaped and amplified within the electronic component of the circuit to charge coil 23 and fire spark plug 28. The shaft rotates the timing disk 120 degrees thereby causing the second magnet 3 to induce a voltage pulse to the sensor pickup 4. This voltage pulse is shaped and amplified in the electronic components of the circuit to charge coil 23 thereby firing the spark plugs 28. The shaft and timing disk is rotated another 120 degrees and the third magnet 3 induces a voltage into the sensor pickup 4. This voltage pulse is shaped and amplified within the electronic components of the circuit to charge coil 23 thereby firing the spark plug 28. Shaft 16 rotates timing disk back to their original position and firing starts over. There are three firings per revolution. The timing disk of FIG. 11 when used with a rotary combustion engine with six cylinder chambers fires six times per revolution. This timing disk operates basically as the timing disk of FIG. 6 except that it has six magnets and two sensor pickups. There may be spark plugs in opposite cylinder chambers which fire at the same time. A magnet induces a voltage pulse into the sensor pickup at 0 degree and at 180 degrees. This voltage pulse is shaped and amplified within the electronic components of the circuit to charge coil 23 thereby firing the spark plugs. The shaft and timing disk rotate 60 degrees to where the next magnets 3 induces voltage pulses into the sensor pickups and the firing continues. The electronic ignition system of this invention may be used on two cycle or four cycle reciprocal combustion engines of one or more cylinders. The electronic ignition system of FIG. 5, 6, 9 and 12 may be used for reciprocal engines of one or more cylinders. These timing disks operate basically alike on rotary combustion engines. It will be understood that various changes and modifications may be made in the constructions described which provide the characteristics of this invention without departing from the spirit thereof particularly as defined in the following claims.

I claim:

1. An electronic ignition system for combustion engines for detecting the engine's shaft angle on two and four cycle combustion engines, a detecting disk coaxially connected to an end of said engine's shaft and provided with a plurality of first permanent magnets disposed at angular intervals corresponding to each cylinder group, and second plurality of permanent magnets disposed at angular intervals on the said disk located a few degrees away from the said first permanent magnets and timed for a second firing in each cylinder group, a sensor pickup for detecting said permanent magnets and for generating first and second pulse signals for each cylinder group, and generating a timing difference for each said cylinder group and a second firing timing difference for each said cylinder group, and improvement of the system comprising:

a waveform shaping circuit responsive to said first pulse signals then responsive to second pulse signals for generating pulse signals occurring from said first and second permanent magnets;

discriminating means responsive to said first and second permanent magent's signals for determining an ignition timing for accurate control of firing cylinders.

* * * * *